April 25, 1939.  W. F. MacGREGOR  2,155,671
COMBINATION HARVESTER THRESHER
Filed May 20, 1936
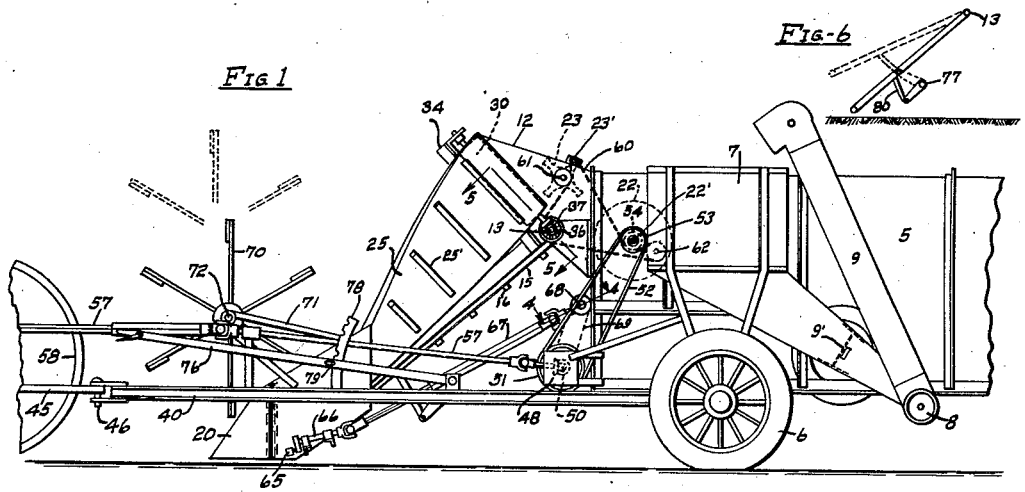
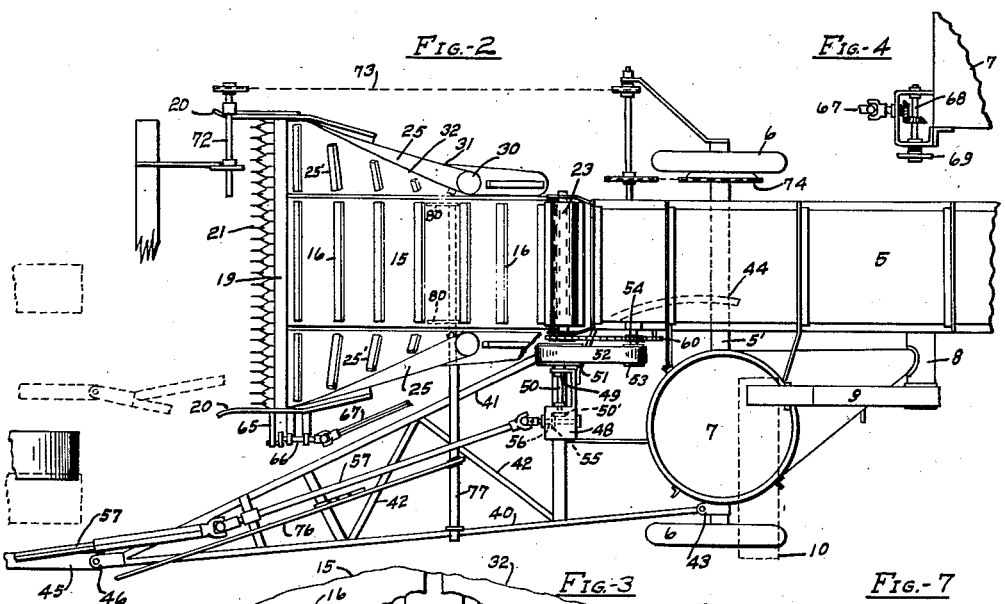
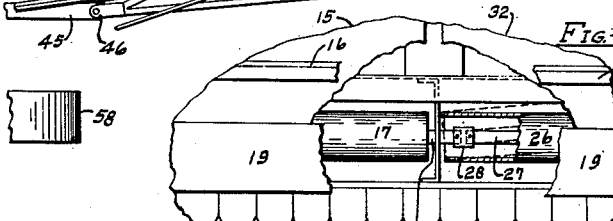
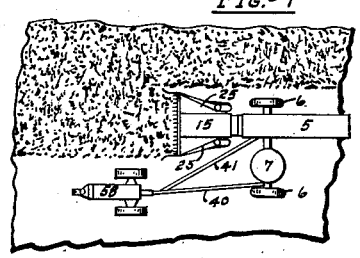
INVENTOR.
WALLACE F. MacGREGOR
BY James A. Walsh
ATTORNEY Patented Apr. 25, 1939

2,155,671

UNITED STATES PATENT OFFICE 2,155,671

COMBINATION HARVESTER THRESHER

Wallace F. MacGregor, Racine, Wis., assignor to J. I. Case Company, Racine, Wis., a corporation Application May 20, 1936, Serial No. 80,729

3 Claims. (Cl. 56—21)

My present invention relates to improvements in combination harvester threshers commonly designated as combines, and particularly to the general purpose type adapted for harvesting grain, beans, peas and other crop growths, and which may be readily transported and operated by a tractor, my object being to provide a machine of this character limited in size and capable of efficient operation with minimum manual attendance, as will hereinafter more fully appear.

In the accompanying drawing, forming part hereof, Figure 1 is a side elevation of a combine embodying my improvements; Fig. 2, a plan view; Fig. 3, a detail sectional view of the lower portion of the header; Fig. 4, a detail section taken on the dotted line 4—4 in Fig. 1; Fig. 5, a detail section taken on the dotted line 5—5 in Fig. 1; Fig. 6, a detail section of the lever and connection for vertically adjusting the header; and Fig. 7 is a diagrammatic view indicating the machine in field operation.

In said drawing the numeral 5 indicates the thresher element of the combine, containing the usual separating and cleaning mechanisms, mounted on wheels 6, and equipped with a grain bin 7 of any desired construction into which threshed grain discharging through the auger 8 is conveyed by an elevator 9, which elevator also conveys the grain directly from the bin to a vehicle (not shown) by placing a chute 10 below the discharge end of the elevator and opening the valve 9', Fig. 1, in the bin outlet, thereby permitting the grain to be discharged from the bin with the same elevator employed for filling it, in a manner similar to that disclosed in the MacGregor Patent No. 1,615,334.

Combines, as commonly constructed, include a header extending laterally of the thresher an appreciable distance and which discharges the cut grain into the side of the feeder housing of the thresher, which assemblage of elements is of considerable width and of cumbersome character, while the driving systems thereof are complex, in many cases including an engine mounted on the thresher; and it is an object to simplify such a machine by assembling the header and thresher in longitudinal relation and actuating the operating mechanisms thereof from the usual tractor power take-off shaft, which actuation I am enabled to readily accomplish by employing in connection with such driving mechanisms a swinging drawbar of the character disclosed in the Krause Patent No. 1,848,359.

At the entrance to the feed chamber 12 of the thresher a shaft 13 is provided upon which is securely mounted a roller 14, Fig. 5, about which the main section 15 of the carrier forming part of the header is adapted to run, said section being preferably inclined and provided with cross slats 16, the lower portion of the section passing about a roller 17 loosely mounted on a shaft 18, Fig. 3, and positioned beneath a shield 19 connecting guides 20 between which cutting mechanism 21 of desired construction is supported.

The main carrier section 15, as indicated, Fig. 2, runs about the roller 17 under the shield 19, over which shield the cut material moves as the header advances and which is conveyed into feed chamber 12 and urged toward cylinder 22 by a beater 23, the cylinder being mounted on a shaft 22' as is common. In order to efficiently gather and convey the crop and to impart a degree of compactness to the header mechanism I provide auxiliary carrier sections 25, one at each side of the main section 15, the lower portion of each passing about a roller 26 loosely mounted on a shaft section 27 flexibly connected at 28 to the shaft 18 to provide means whereby the roller may be adjusted to guide the carrier in the desired path. These auxiliary sections are provided with slats 25' and occupy a horizontal position in passing over said rollers 26, and as the upper surface 32 of the carrier is moved rearwardly it is gradually twisted from a horizontal plane at the lower end to a vertical plane at the upper end where the carriers pass over the upright rollers 30, so that the runs 31, 32, of each carrier assume the position shown in Fig. 2. By this arrangement the auxiliary carriers cooperate with the main carrier 15 to converge the material from the cutting width of the header to the reduced width of the feed chamber to urge the material into the latter, and as said auxiliary carriers are in converging relation the masses of material in their upward movements gradually become more compact and therefore readily enter the chamber 12 to be within the influence of the beater 23 for effective feeding operation to the cylinder.

The upper rollers 30, Fig. 1, are supported in bearings 34 and the lower ends of their shafts carry bevel gears 35, Fig. 5, engaging a similar gear 36 on shaft 13 having a sprocket 37 integrally formed with said gear or which may be separately mounted on shaft 13.

The drawbar comprising members 40, 41, connected by suitable braces, as 42, is connected to the thresher axle 5', as at 43 and 44, in substantially the manner disclosed in said Krause patent herein referred to, so that said drawbar may be adjusted laterally, the forward end thereof being connected to the tractor drawbar 45, as at 46, in any suitable manner. A suitably supported gear casing 48 is mounted upon the thresher and which with a bearing 49 supports a driven shaft 50 having a pulley 51 thereon connected by a belt 52 to a pulley 53 on cylinder shaft 22' having a sprocket 54 thereon, said shaft 50 being provided with a bevel gear 50' engaging and driven by a similar gear 55 on a shaft 56 connected to and actuated by the power take-off shaft 57 of the tractor 58 in a manner well known. A driving system for the conveyors 15 and 25 and the beater 23 comprises a chain 60 engaging the sprocket 54 and also sprocket 37, and which chain runs about idler 23' and sprocket 61 associated with the beater 23, and also an idler 62 supported by the thresher, and, as will be understood, said chain 60 is driven by the cylinder shaft 22' through the belt system 51—53.

Extending from the sides of the lower portion of the header are the guides comprising the members 20 between which is mounted the cutting mechanism 21 of desired construction actuated by a pitman 65 connected to a shaft 66 supported on the header, which shaft is in turn connected to and driven by a flexible shaft 67 engaging the driving shaft 68 actuated by a sprocket-and-chain system 69 from the shaft 50, as shown in Figs. 1 and 4. A reel 70 for deflecting material to the cutting mechanism 21 may also be mounted on the guides 20 by supports 71 or otherwise, said reel being rotated by its shaft 72 connected by a sprocket-and-chain system 73—74 to a wheel 6, Fig. 2, of the combine, so that the speed of the reel will be governed by the varying movements of the traveling machine.

In field operation, as indicated in Fig. 7, the tractor 58 is steered to traverse the stubbleward side of the grain while the combine moves forwardly in position to cut and gather the standing grain. During the harvesting operation it is necessary to adjust the cutting mechanism to various distances above the ground according to varying heights of material being cut which is accomplished by a lever 76 secured to a cross-shaft 77 fulcrumed on the drawbar, the lever engaging a quadrant 78 by means of its detent 79, the cross-shaft being connected to the header by linkage mechanism 80, so that manipulation of said lever will cause the forward end of the header as a whole to be adjusted, pivoting about shaft 13, and which adjustment will also permit the drawbar to be swung laterally thereunder when the tractor is steered to the position indicated by dotted lines in Fig. 2, and, as will be understood, when resuming harvesting operations the tractor is steered to the position indicated in Fig. 7 and the header lowered by said lever to the cutting position substantially as indicated in Fig. 1.

I claim as my invention:

1. In a machine of the class described, a thresher, supporting means arranged to carry the thresher in a predetermined direction, said thresher including a feed chamber and a cylinder at its forward end, a beater in said chamber, a header comprising cutting mechanism and a plurality of carriers pivotally connected to the thresher, said carriers including lower and upper rollers, a sprocket-and-chain system connecting said cylinder, upper rollers and beater, a drawbar connected to the thresher and header and shiftable relatively to said supporting means, a power shaft supported on the drawbar and connected to and driven by a tractor, means connecting the power shaft and cylinder for actuating the latter and said beater, rollers and carriers, and means connecting the power shaft and cutting mechanism for actuating the latter to cut crop material to be conveyed by the carriers and directed by said beater to the cylinder to be threshed.

2. In a machine of the class described, a thresher including a cylinder, supporting means arranged to carry the thresher in a predetermined direction; a header embodying crop deflecting means, cutting mechanism and a carrier pivotally connected to the thresher; a drawbar connected to the thresher and header and shiftable relatively to said supporting means; a power shaft supported on the drawbar and connected to and driven by a tractor; a sprocket-and-chain system connecting the cylinder and carrier; means connecting the power shaft and cylinder for actuating the latter and the carrier; means connecting the power shaft to the cutting mechanism for actuating the latter; means connecting the thresher to the deflecting means for actuating the latter; and means supported on the drawbar and connected to the header for vertically adjusting the latter.

3. In a machine of the class described, a thresher supporting means arranged to carry the thresher in a predetermined direction; a header pivotally connected to the thresher comprising cutting mechanism and a conveyor, a drawbar connected to the thresher and to the header and shiftable relatively to said supporting means; a power shaft supported on the drawbar; means connecting the drawbar and thresher for actuating the latter together with the conveyor and cutting mechanism; a rock-shaft connecting the drawbar and header; means connecting the rock-shaft and header; and a lever mounted on the rock-shaft for actuating the same to vertically adjust the header.

WALLACE F. MacGREGOR.